United States Patent [19]

Emerick

[11] 4,014,209

[45] Mar. 29, 1977

[54] AIR FILTER CONDITION INDICATING DEVICE

[76] Inventor: Wayne L. Emerick, Rte. 20, Box 2006, Springfield, Mo. 64803

[22] Filed: Dec. 15, 1975

[21] Appl. No.: 641,692

[52] U.S. Cl. .................. 73/119 R; 73/38; 116/114 AE; 116/117 R; 116/DIG. 25

[51] Int. Cl.² .................. G01N 15/00; G01M 19/00

[58] Field of Search ............ 116/114 AE, DIG. 25, 116/114 AD, 114 R, 117 R, 117 C; 73/38, 211, 401, 119 R; 55/270, 274

[56] References Cited

UNITED STATES PATENTS

| | | | |
|---|---|---|---|
| 2,127,501 | 8/1938 | Dall | 73/211 |
| 2,306,940 | 12/1942 | Fischer | 73/211 |
| 2,439,723 | 4/1948 | Engdahl | 73/211 |
| 3,172,746 | 3/1965 | Shuck | 116/DIG. 25 |
| 3,298,234 | 1/1967 | Goldman | 73/401 |
| 3,312,187 | 4/1967 | McKinlay | 116/DIG. 25 |
| 3,583,218 | 6/1971 | Van Nostrand | 73/38 |
| 3,672,129 | 6/1972 | Strople | 55/270 |

FOREIGN PATENTS OR APPLICATIONS

| | | | |
|---|---|---|---|
| 200,857 | 11/1958 | Austria | 116/DIG. 25 |
| 217,789 | 7/1960 | Austria | 116/DIG. 25 |

Primary Examiner—S. Clement Swisher
Assistant Examiner—Denis E. Corr
Attorney, Agent, or Firm—Fishburn, Gold & Litman

[57] ABSTRACT

An air filter condition indicating device particularly adapted for use with an air filter positioned in an air flow path, such as in an air induction system of an internal combustion engine for continuously sensing and indicating flow condition of an air filter in the air induction system. The disclosed device includes a transparent tubular member having liquid therein and arranged in a generally U-shaped path with a first leg thereof positioned adjacent an indicia member and adjacent an observation aperture in one wall of a gauge housing. A first flow member communicates between an upstream side of the filter or an air intake portion of the air induction system and an upper end portion of the first leg of the tubular member. A second flow member communicates between a downstream side of the filter or a central cavity of the air filter and an upper end portion of a second leg of the tubular member whereby reduced pressure adjacent the downstream side or central cavity of the air filter effects movement of the liquid in the tubular member first leg relative to the indicia member.

2 Claims, 4 Drawing Figures

AIR FILTER CONDITION INDICATING DEVICE

The present invention relates to filter condition indicating devices and more particularly to a filter condition indicating device particularly adapted for use with an air induction system of an internal combustion engine for continuously sensing and indicating flow condition of an air filter in the air induction system.

Customary preventive maintenance procedures for motor vehicles periodically checking the oil system of the internal combustion engine. Oil filtering mediums are normally replaced only when necessary and engine oil is usually replaced on a regular schedule, for example, either on a time basis or a miles driven basis. The air induction system and the air filter are often neglected and only examined when difficulty and malfunction of the engine suggest that the air system is no longer serviceable.

Dirty or clogged air filters reduce the amount of air available for the combustion process thereby contributing to substantially decreased efficiency in engine operation. Particularly in dry and dusty areas, such as rural roads, farm fields, and arid regions, the air filter in the air induction system becomes rapidly unserviceable by being clogged with dust particles and the like. Unless the air filter is cleaned or replaced there is a substantial decrease in the operating efficiency of the engine and a substantial increase in fuel consumption and other related difficulties soon become apparent. Engine oil also rapidly becomes dirty and contains abrasive particles which damage metal surfaces desired to be protected by the engine oil. Engine life is greatly increased by preventing accumulation of abrasive particles in the engine oil, as by replacement of air filters prior to becoming completely clogged and dirty.

The principal objects of the present invention are: to provide a filter condition indicating device particularly adapted for indicating flow capacity through an air filter and indicating need for filter replacement or cleaning; to provide such a filter condition indicating device particularly adapted for use with air induction systems of motor vehicles including automobiles, trucks, tractors, and the like having either gas or diesel internal combustion engines; to provide such a filter condition indicating device wherein differential pressure on opposite sides of a filter effects movement of liquid in a tubular member relative to an adjacent indicia member; to provide such a filter condition indicting device adapted to be mounted on or in a dashboard of a motor vehicle or at an other position easily seen by an operator of the vehicle; and to provide such a filter condition indicating device which is economical to manufacture, has long service life, and is particularly well adapted for the proposed use.

Other objects and advantages of the present invention will become apparent from the following description taken in connection with the accompanying drawings wherein are set forth, by way of illustration and example, certain embodiments of this invention.

The drawings constitute a part of the specification and include an exemplary embodiment of the present invention and illustrate various objects and features of the filter condition indicating device.

Figure 1:
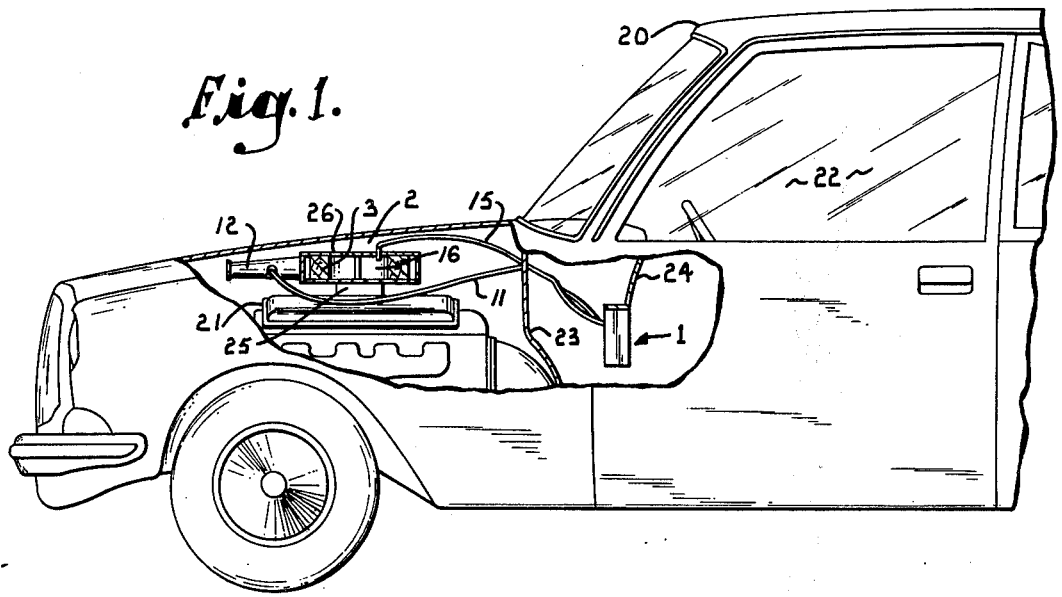
FIG. 1 is a fragmentary side elevational view of an automobile with portions broken away to show a filter condition indicating device mounted thereof and embodying features of the present invention.
Figure 2:
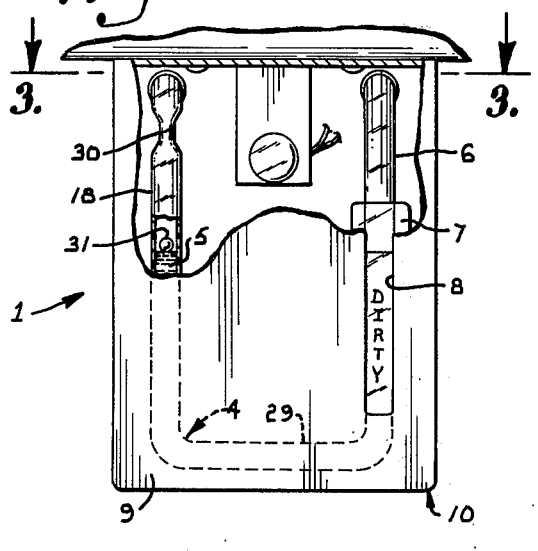
FIG. 2 is an enlarged front elevational view of the filter condition indicating device with portions broken away to better illustrate component parts thereof and shown indicating a clean air filter.
Figure 3:
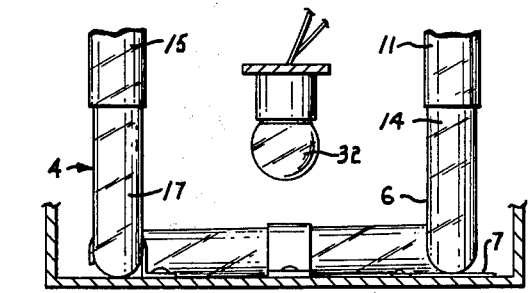
FIG. 3 is an enlarged transverse sectional view taken on line 3—3 of FIG. 2.
Figure 4:
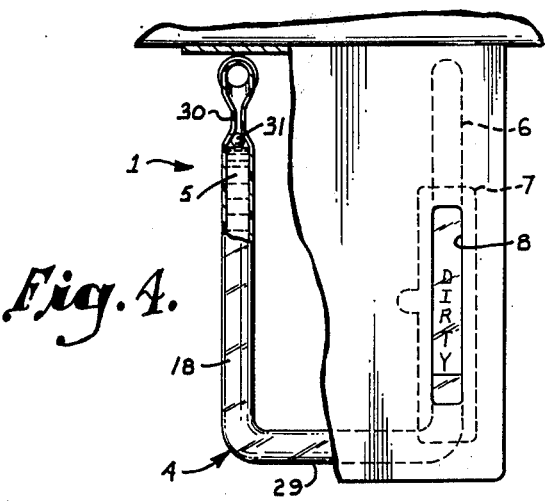
FIG. 4 is an enlarged front elevational view of the filter condition indicating device similar to FIG. 2 except shown indicating a dirty air filter.

As required, detail embodiments of the present invention are disclosed herein. However, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriately detailed structure.

Referring more in detail to the drawings:

In the disclosed embodiment of the present invention, the reference numeral 1 designates generally a filter condition indicating device for use with an air filter positioned in an air flow path, such as in an air induction system 2 of an internal combustion engine for continuously sensing and indicating flow condition of an air filter 3 in the air induction system 2. The filter condition indicating device 1 includes a liquid retaining receptable in the form of a transparent tubular member 4 having a liquid 5 therein and arranged to have a first upstanding portion in the form of a first leg 6 thereof positioned adjacent an indicia member 7 and adjacent an observation aperture 8 in one wall 9 of a gauge housing 10. A first flow member 11 communicates between an upstream side of the filter or an air intake portion 12 of the air induction system 2 and an upper end portion 14 of the first leg 6 of the tubular member 4 and a second flow member 15 communicates between a downstream side of the filter or a central cavity 16 of the air filter 3 and an upper end portion 17 of a second upstanding portion in the form of a second leg 18 of the tubular member 4 whereby reduced pressure adjacent the downstream side or within central cavity 16 of the air filter 3 effects movement of the liquid 5 in the tubular member first leg 6 relative to the indicia member 7.

The air filter condition indicating device 1 is adapted to sense and indicate differential pressure on opposite sides of an air filter positioned in an air flow path. The air filter condition indicating device 1 is adapted for use with furnace and air conditioning units for home or commercial use. The illustrated device is mounted on a motor vehicle 20.

As is conventional, the motor vehicle 20 includes an internal combustion engine 21 positioned in a compartment and separated from an operator's cabin or passenger compartment 22 by a fire wall 23 having a dashboard 24 thereon. The engine 21 includes a carburetor 25 and an air cleaner housing 26 having the air filter 3 therein and mounted above the carburetor 25. The air cleaner housing 26 is part of the air induction system 2 and includes an air intake portion 12 and a central cavity 16 with the air filter 3 therein.

The air filter 3 is positioned in the air flow path and has an upstream side and a downstream side. In the illustrated filter condition indicating device, the filter 3 is cylindrical with an exterior surface thereof defining an upstream side and with the central cavity 16 defining a downstream side of the filter 3. Any suitable material may be used for the filter 3 including metal, paper, plastic, and the like.

The illustrated gauge housing 10 is spaced from the air cleaner housing 26 and is adapted to be mounted in or on the dashboard 24. When the gauge housing 10 is on or below the dashboard 24, the gauge housing 26 has wall members defining a chamber therein. The one wall member 9, for example, the front wall member, has the observation aperture 8 therein.

The liquid retaining receptacle or tubular member 4 is preferably cylindrical and is positioned in the gauge housing 10 and arranged to define a generally U-shaped path including the first leg 6 and the second leg 18 with means communicating the legs 6 and 18 in the form of a connection portion 29 extending therebetween. The tubular member 4 is preferably formed of transparent material, such as glass, plastic or the like. The first leg 6 is positioned adjacent and visible through the observation aperture 8.

The liquid 5 may be any suitable liquid, such as oil, mercury, colored water, and the like which would be visible through the observation aperture 8. The liquid 5 will move from the first leg 6 into the second leg 18 of the tubular member 4 in response to reduction in pressure within the central cavity 16 of the filter 3. In the event of sufficient reduction in pressure, the liquid 5 in the tubular member 4 would move from the second leg 18 through the second flow member 15 into the central cavity 16 of the filter 3 and then into the carburetor 25. Therefore, the second leg 18 of the tubular member 4 has a neck portion 30 adjacent the upper end 17 thereof.

A float member 31 is positioned in the tubular member second leg 18 and adapted to float on the liquid 5 in the second leg 18 and to seat in the neck portion 30 and thereby prevent flow of liquid 5 into the second flow member 15. The float member 31 may be any desired shape or of any desired material. In the illustrated embodiment, the float member 31 is spherical and formed of hollow plastic.

The indicia member 7 provides means visible by an operator of the motor vehicle 20 which indicates condition of the filter 3, such as clean, partially dirty, or dirty. The indicia member may be part of the tubular member or a separate member. The indicia member 7 may be the word "DIRTY" on a separate transparent member or on one of the sides of the tubular first leg 6 whereby as the filter 3 becomes clogged and liquid level in the first leg falls or moves relative to the indicia member 7, more and more of the work "DIRTY" becomes exposed. When completely exposed it is time to replace or clean the filter 3.

An alternate indicia member could be color coded, for example, a green band visible when the filter 3 is new or cleaned, a yellow band visible as a liquid level in the first leg 6 falls or lowers in response to partial clogging of the filter 3, and a red band visible as the liquid level falls or lowers even more in response to more clogging of the filter 3. When the word "DIRTY" or the red band is visible, air flow is substantially reduced and thus dust particles and the like enter the carburetor 25 and thereby enter the engine oil discoloring same and thereby damage to surfaces sought to be protected by the oil.

The first flow member 11 senses atmospheric pressure and more particularly the pressure in the air intake portion 12 of the air cleaner housing 26 and thereby sensing the air pressure upstream of the filter 3. The first flow member 11 may be any suitable conduit extending between the air intake portion 27 and the upper end portion 14 of the first leg 6 of the tubular member 4. The first flow member 11 may be substantially rigid or flexible as necessary for the particular vehicle.

The second flow member 15 senses pressure adjacent the downstream side of the filter 3. In the illustrated embodiment, the second flow member 15 extends between the central cavity 16 of the filter 3 and the upper end portion 17 of the second leg 18 of the tubular member 4. As with the first flow member 11, the second flow member 15 may be any suitable conduit and either substantially rigid or flexible as desired. The flow members 11 and 15 may, therefore, be metal conduit, plastic hose, rubber hose, or the like as desired.

The filter condition indicating device 1 thereby continuously senses differential pressure on opposite sides of a filter, such as an air cleaner filter 3, and indicates condition thereof. As the amount of pressure differential increases due to additional reduction of pressure adjacent to the downstream side of the filter 3, the liquid 5 moves from the first leg 6 into the second leg 18 thereby exposing the word "DIRTY" or the red area or band of the indicia member 7. When same is exposed, replacement or cleaning of the filter substantially improves engine performance through improved combustion thereby effecting improved fuel economy.

It is desirable that the indicia member 7 be visible at night, therefore, an illuminating means 32 is mounted within the gauge housing 10 and positioned adjacent the tubular member first leg 6 and the indicia member 7. The illuminating means 32 is operative to illuminate the indicia member 7 and the tubular member first leg 6.

It is to be understood that while I have illustrated and described one form of my invention, it is not to be limited to the specific form or arrangement of parts herein described and shown.

What I claim and desire to secure by Letters Patent is:

1. An air flow condition indicating device for continuously sensing and indicating the flow conditions of an air induction system and filter of an internal combustion engine and comprising in combination:
   a. an air filter housing having an air intake portion and a central cavity communicating with a carburetor of an internal combustion engine, said air filter housing being positioned in an air induction system of an internal combustion engine;
   b. a generally cylindrical air filter having an exterior surface and a central cavity therein, said air filter being positioned in said central cavity of said air filter housing and sealingly engaged therewith between the air intake portion and the communication with the carburetor;
   c. a gauge housing mounted on an automobile dashboard in spaced relation with said air filter housing, said gauge housing having walls defining a chamber therein, one of said gauge housing walls having an abservation aperture therein;
   d. a tubular member positioned in said gauge housing and arranged to define a generally U-shaped path having a first leg and a second leg each having an upper end portion, said first leg of said tubular member having a transparent portion positioned adjacent and visible through said observation aperture in said gauge housing;

e. a liquid in said tubular member and positioned in said first and second legs;

f. indicia means in said gauge housing and positioned between said observation aperture in said gauge housing and said first leg of said tubular member, said indicia means being visible through said observation aperture in said guage housing;

g. first flow means having one end thereof connected to the upper end portion of said first leg of said tubular member and communicating between said air intake portion of said air filter housing and said tubular member first leg;

h. second flow means having one end thereof connected to the upper end portion of said second leg of said tubular member and communicating between said central cavity of said air filter and said tubular member second leg whereby reduced pressure in said air filter central cavity effects movement of the liquid in said tubular member first leg relative to said indicia means;

i. means defining a neck portion in said tubular member second leg and positioned adjacent said upper end portion of said second leg;

j. a float member in said tubular member second leg and adapted to float on said liquid therein and seat in said neck portion of said second leg to prevent flow of said liquid through said second flow means in the event of reduction in pressure in said air filter central cavity in response to reduced flow through said air filter; and k. illuminating means mounted in said gauge housing and positioned adjacent said tubular member first leg for illuminating said indicia means and said tubular member first leg.

2. An air flow condition indicating device for continuously sensing and indicating the flow conditions of an air induction system and filter of an internal combustion engine and comprising in combination:

a. an air filter housing having an air intake portion and a central cavity communicating with a carburetor of an internal combustion engine, said air filter housing being positioned in an air induction system of an internal combustion engine;

b. a generally cylindrical air filter having an exterior surface and a central cavity therein, said air filter being positioned in said central cavity of said air filter housing and sealingly engaged therewith between the air intake portion and the communication with the carburetor;

c. a gauge housing mounted on an automobile dashboard in spaced relation with said air filter housing, said gauge housing having walls defining a chamber therein, one of said gauge housing walls having an observation aperture therein;

d. a tubular member positioned in said gauge housing and arranged to define a generally U-shaped path having a first leg and a second leg each having an upper end portion, said first leg of said tubular member having a transparent portion positioned adjacent and visible through said observation aperture in said gauge housing;

e. a colored liquid in said tubular member and positioned in said first and second legs;

f. indicia means positioned to be exposed and visible through said observation aperture in said guage housing upon movement of the colored liquid from said first leg of said tubular member;

g. first flow means having one end thereof connected to the upper end portion of said first leg of said tubular member and communicating between said air intake portion of said air filter housing and said tubular member first leg;

h. second flow means having one end thereof connected to the upper end portion of said second leg of said tubular member and communicating between said central cavity of said air filter and said tubular member second leg whereby reduced pressure in said air filter central cavity effects movement of the colored liquid in said tubular member first leg to expose said indicia means.

* * * * *